United States Patent Office.

R. O. LOWREY, OF SALEM, NEW YORK.

Letters Patent No. 80,641, dated August 4, 1868.

---

IMPROVED ARTIFICIAL GUM FOR COATING AND WATER-PROOFING.

---

The Schedule referred to in these Letters Patent and making part of the same.

---

TO ALL WHOM IT MAY CONCERN:

Be it known that I, R. O. LOWREY, of Salem, in the county of Washington, and State of New York, have invented certain new and useful Improvements in Composition of Matter for an Artificial Gum; and I do hereby declare that the following is a full, clear, and exact description thereof.

To enable others skilled in the art to construct and use my invention, I will proceed to describe it.

My invention relates to composition of matter, and consists of a new and useful combination of soap with alum and salt, or their equivalents, as hereinafter mentioned, by which I form an artificial gum, which will unite with oils, resins, wax, and similar substances, so as to produce a useful varnish or paint, valuable for many purposes, as well as a good cement.

In making my composition, I take common soap and dissolve it in water until the solution becomes sufficiently thin for my purpose; I then take common salt and alum, in about equal parts, and dissolve them in water, making the solution of any strength desired.

Instead of salt, (chloride of sodium,) other chlorides or substances having a saline quality may be used; and instead of alum, (sulphate of alumina and sulphate of potassa,) other alums or sulphates or acetates may be used with similar results, varying more or less in their characteristics. I prefer, however, to use the salt and alum.

These two solutions I thoroughly mix, by pouring one into the other, and then stirring the mixture, or by uniting them in any way that will cause them to be completely intermingled, and allow them to remain until an insoluble compound floats upon the surface, formed by the action of these solutions upon each other.

This takes place in a shorter or longer time, depending upon the temperature and strength of the solutions when mixed. While the resultant is the same, I have found that when heated to about the boiling-temperature, the object is accomplished in a few minutes.

The insoluble compound that rises to the surface assumes a lumpy or granular form, which I remove by skimming or straining, and then rinse or wash it in water, so as to remove entirely any soluble matter that may still be adhering to it. After this, I separate the water from it in any convenient way, by straining, pressing, and drying. The drying may be done in the open air or artificially.

The compound thus formed, I characterize as my "artificial gum," and term it insoluble, in the usual acceptation of the term, having reference specially to the action of water.

This compound may be usefully employed for various purposes. By combining it with oil, grease, wax, ordinary gums, and similar substances, it forms an excellent varnish, paint, or cement for coating the surfaces of all kinds of substances requiring such kind of protection.

In combining my compound with any or all of these materials, I reduce them to the proper liquid state for the purpose, either by melting them separately or together, in the open air, or in a closed retort, or by dissolving them by any suitable solvent, and then mix them.

The mixture I make of any degree of thinness required, when it is ready to be applied as a sizing, paint, varnish, or cement for coating surfaces.

In making sizing, varnish, paint, or cement of different qualities, and for different purposes, especially for thoroughly water-proof adhesive cements or coatings, I vary the quantity of the gums, oils, resins, grease, wax, &c., used, so as to secure a mixture of the desired quality and consistency. When I desire to give it a body or any particular color, I introduce suitable earthy substances or pigments for that purpose.

For some purposes, I find that fibrous materials, properly prepared, may be advantageously combined with my compound. The mass thus formed may be made into sheets (like cloth) or simply used to coat fabrics, or the mass may be so compounded as to make mouldings and forms of different kinds, or may be formed into buttons and other useful articles. I have found that my compound may also be so combined with oils, gums, &c., as to answer for all these purposes, without the addition of fibrous materials, and, for some purposes, may be used alone.

The sizing, paint, varnish, or cement made as described, forms an insoluble coating which is water-proof, and serves to protect and preserve the articles or materials to which it may be applied.

My compound being dry, insoluble, and granulated, can be conveniently stored or packed for transportation. It posesses as great utility and value as the articles now used for similar purposes, and can be produced much easier and furnished at a far less cost.

Having thus described my invention, what I claim, is—

1. The composition, made by mixing a solution of salt and alum with a solution of soap, as herein described, for the purpose of producing an artificial gum.

2. The composition, made by mixing my artificial gum with oils, resins, grease, gum, wax, fibrous materials, or their equivalents, substantially as herein described, and for the purpose set forth.

R. O. LOWREY.

Witnesses:
H. B. MUNN,
P. T. DODGE.